United States Patent
Torres et al.

(10) Patent No.: US 10,314,366 B2
(45) Date of Patent: Jun. 11, 2019

(54) MATERIAL FOR DEVELOPING/MAINTAINING OR COMPENSATING FOR MOTOR SKILLS

(71) Applicants: Charisse Torres, East Orange, NJ (US); Elise Bourne-Busby, Passaic, NJ (US); Ethel Edwards, Passaic, NJ (US)

(72) Inventors: Charisse Torres, East Orange, NJ (US); Elise Bourne-Busby, Passaic, NJ (US); Ethel Edwards, Passaic, NJ (US)

( * ) Notice: Subject to any disclaimer, the term of this patent is extended or adjusted under 35 U.S.C. 154(b) by 142 days.

(21) Appl. No.: 15/486,812

(22) Filed: Apr. 13, 2017

(65) Prior Publication Data

US 2017/0295887 A1   Oct. 19, 2017

Related U.S. Application Data

(60) Provisional application No. 62/321,778, filed on Apr. 13, 2016.

(51) Int. Cl.

| A43C 9/00 | (2006.01) |
|---|---|
| A43C 1/02 | (2006.01) |
| B32B 7/12 | (2006.01) |
| A43C 9/04 | (2006.01) |
| B29C 63/42 | (2006.01) |
| B29D 99/00 | (2010.01) |
| B32B 5/24 | (2006.01) |
| B32B 5/26 | (2006.01) |
| B32B 9/04 | (2006.01) |
| B32B 29/02 | (2006.01) |
| B32B 1/08 | (2006.01) |

(Continued)

(52) U.S. Cl.
CPC .......... *A43C 1/02* (2013.01); *A43C 9/00* (2013.01); *A43C 9/04* (2013.01); *B29C 63/42* (2013.01); *B29D 99/0064* (2013.01); *B32B 1/08* (2013.01); *B32B 3/08* (2013.01); *B32B 5/24* (2013.01); *B32B 5/26* (2013.01); *B32B 7/12* (2013.01); *B32B 9/047* (2013.01); *B32B 29/02* (2013.01); *B29K 2023/00* (2013.01); *B29L 2031/508* (2013.01); *B32B 2250/20* (2013.01); *B32B 2255/02* (2013.01); *B32B 2255/24* (2013.01); *B32B 2255/26* (2013.01); *B32B 2262/02* (2013.01); *B32B 2262/0246* (2013.01); *B32B 2262/0276* (2013.01); *B32B 2262/062* (2013.01); *B32B 2262/08* (2013.01); *B32B 2262/12* (2013.01); *B32B 2307/50* (2013.01); *B32B 2437/02* (2013.01)

(58) Field of Classification Search
CPC .................................. A43C 1/02; A43C 9/00
See application file for complete search history.

(56) References Cited

U.S. PATENT DOCUMENTS

| 579,943 A | 3/1897 | Kempshall |
|---|---|---|
| 943,607 A * | 12/1909 | Schelling ............. A43C 1/02  24/715.3 |

(Continued)

*Primary Examiner* — Jason W San
(74) *Attorney, Agent, or Firm* — Gearhart Law, LLC (57) ABSTRACT

Described herein is a flexible but resilient material comprising a soft outside shell and an internal flexible but resilient support core, as well as a method for constructing such a flexible but resilient material that can have multiple applications, including being used to manufacture an improved shoelace to help young children, individuals who are physically challenged, and/or who have a limiting physical disability.

18 Claims, 4 Drawing Sheets

(51) Int. Cl.
*B32B 3/08* (2006.01)
*B29K 23/00* (2006.01)
*B29L 31/50* (2006.01)

(56) References Cited

U.S. PATENT DOCUMENTS

| | | | | |
|---|---|---|---|---|
| 1,770,786 | A * | 7/1930 | Kohler | A43C 1/02 24/715.3 |
| 1,853,551 | A * | 4/1932 | Crimmins | D02G 3/32 24/715.3 |
| 1,853,666 | A * | 4/1932 | Crimmins | D02G 3/32 139/421 |
| 1,948,844 | A * | 2/1934 | Dawes | A43C 1/02 24/715.3 |
| 2,477,151 | A * | 7/1949 | Stapleton | A43C 9/00 24/713 |
| 2,646,630 | A | 7/1953 | Barlow | |
| 2,887,005 | A * | 5/1959 | Fromm | A43C 1/02 87/1 |
| 3,566,481 | A | 3/1971 | Wanda | |
| 3,683,520 | A | 8/1972 | Partagas | |
| 4,423,539 | A * | 1/1984 | Ivanhoe | A43C 1/02 24/715.3 |
| 4,426,756 | A | 1/1984 | Herdman | |
| 4,637,798 | A | 1/1987 | Maiden-Nesset | |
| 4,721,468 | A | 1/1988 | Alexander | |
| 4,842,522 | A | 6/1989 | Alexander | |
| 4,858,282 | A * | 8/1989 | DuPont, Jr. | A43C 9/00 24/712 |
| 5,029,372 | A | 7/1991 | Brinson | |
| 5,209,667 | A | 5/1993 | Stanfield | |
| 5,562,457 | A | 10/1996 | Haslam | |
| 5,639,244 | A | 6/1997 | Stricklin | |
| 5,673,546 | A * | 10/1997 | Abraham | A43C 9/00 24/713 |
| 5,897,323 | A | 4/1999 | Stanfield | |
| 5,918,352 | A | 7/1999 | Galbreath | |
| 6,179,178 | B1 * | 1/2001 | Stegmeyer | A45C 13/30 224/257 |
| 6,283,004 | B1 * | 9/2001 | Tseng | D04C 1/12 87/6 |
| 6,382,981 | B1 | 5/2002 | Stanfield | |
| 6,397,854 | B1 | 6/2002 | Bailey | |
| 6,729,784 | B2 | 5/2004 | Gioffre | |
| 6,964,625 | B2 * | 11/2005 | Murphy | A63B 41/085 24/712 |
| 7,036,194 | B2 | 5/2006 | Tricker | |
| 7,309,235 | B2 | 12/2007 | Wilk | |
| 7,549,201 | B2 | 6/2009 | Kraft | |
| 7,713,062 | B2 | 5/2010 | Welling | |
| 8,272,110 | B2 | 9/2012 | Valenzuela | |
| 2006/0024651 | A1 | 2/2006 | Davis | |
| 2006/0088809 | A1 | 4/2006 | Blake | |
| 2008/0086854 | A1 * | 4/2008 | Boyd | A61B 17/064 24/715.3 |
| 2011/0047822 | A1 * | 3/2011 | Pape | A43B 1/0063 36/51 |
| 2011/0195268 | A1 * | 8/2011 | Schaffer | A43C 9/00 428/600 |
| 2012/0144631 | A1 * | 6/2012 | Stanev | A43C 1/02 24/715.3 |
| 2012/0198668 | A1 | 8/2012 | Butler | |
| 2013/0117975 | A1 | 5/2013 | Herrera | |
| 2013/0255045 | A1 * | 10/2013 | Gonzalez | A43C 9/00 24/715.3 |
| 2014/0308641 | A1 | 10/2014 | Tebben | |
| 2015/0230559 | A1 * | 8/2015 | Facer | A43C 9/00 24/715.7 |
| 2017/0318907 | A1 * | 11/2017 | Creton | A43C 1/02 |
| 2017/0367442 | A1 * | 12/2017 | Tsai | A43C 9/02 |

\* cited by examiner

MATERIAL FOR DEVELOPING/MAINTAINING OR COMPENSATING FOR MOTOR SKILLS

CLAIM OF PRIORITY

This application claims priority to U.S. Application 62/321,778 filed on Apr. 13, 2016, the contents of which are herein fully incorporated by reference in its entirety.

FIELD OF THE EMBODIMENTS

The embodiments of the present invention generally relate to a flexible but resilient material and its application in constructing a shoelace and other materials that are capable of retaining a desired shape to help and facilitate development/maintenance motor skills, and/or compensation for motor skill deficits.

BACKGROUND OF THE EMBODIMENTS

Regular shoelaces are commonly comprised of a soft center core and a tube of braided fabric covered on the periphery of the center core. While flexible, such shoelaces, however, may be problematic to certain wearers (e.g., young children, persons who have physical disabilities, or who are physically challenged) in that they may have a difficult time in tying the shoelace up into a particularly shaped (e.g., a bow) knot and further in tightening the shoelace sufficiently to prevent such a knotted shoelace tie from becoming loose or untied during wearing. Over the years, there have been efforts devoted to constructing an improved shoelace in addressing such problems.

REVIEW OF RELATED TECHNOLOGY

U.S. Pat. No. 8,272,110 pertains to an improved shoelace comprised of a plurality of bendable support elements permanently held within a limp material at each of the two end tips by a sleeve, where the bendable supports can be wires of certain thickness made of copper, steel, aluminum, alloy, or any combination thereof and coated in plastic.

U.S. Pat. No. 6,729,784 pertains to a method for inhibiting the loosening of knotted ties, e.g., shoelaces, by applying to the ties a waxy compound comprising a waxy ingredient effective to inhibit the ties from becoming untied.

U.S. Pat. No. 5,209,667 pertains to a shoelace for use by young children or the handicapped, which facilitates tying of a bow by providing a moderately stiff end portion; the stiff end portion can retain a loop shape when a pair of spaced locations on the stiff end portion are temporarily fastened together as by a pair of Velcro® retainers. The shoelace is formed of a flexible shoelace core with first and second opposite end portions, and with the first end portion penetrated by a solidified, originally-liquid stiffening material.

None of the art described above addresses all of the issues that the present invention does. Accordingly, there is a long-felt need for an improved shoelace that can be used easily by children, and persons who are physically challenged and/or with physical disabilities, to tie their shoes. There is also a need for an improved shoelace that does not contain metals or other materials that may pose potential hazards.

SUMMARY OF THE EMBODIMENTS

An embodiment of the present invention relates to a length of a flexible but resilient material comprising: an outside shell and an inner sheath encasing a bendable support assembly, which comprises at least one bendable support element comprising a support element core coated with a wax coating compound. Here, the bendable support assembly is encased in said sheath, which is, in turn, encased in said outside shell. A pre-selected length of said flexible but resilient material comprises a first end and a second end, each of which may be capped by an end-cap.

Another embodiment of the present invention relates to a length of a flexible but resilient material comprising: an outside shell and an inner sheath encasing a bendable support assembly, which comprises more than one bendable support element that may be arranged in various ways, such as, with an even-spacing among them, or having a center support element core that is surrounded by multiple support element cores with an even-spacing, etc. and said bendable support assembly is coated with said wax compound. Multiple, rather than a single, support element core can provide increased strength and rigidity. Here again, the bendable support assembly is encased in said sheath, which is, in turn, encased in said outside shell. A pre-selected length of said flexible, but resilient material comprises a first end and a second end, each of which is capped by an end-cap.

Alternatively in both of the above embodiments, said bendable support assembly encased in said sheath is first encased in an adhesive film sleeve and the resulting encased assembly is, further in turn, encased in said outside shell. The adhesive film sleeve can be made of a plant based or synthetic resin compound with the adhesive on one or both of the faces of a removable plastic or paper backsheet.

In both of the above embodiments, said bendable support element core may be made of a soft and flexible material selected from the group consisting of, but not limited to, wool, cotton, acrylic, fabric, and/or any combination thereof, said sheath is made of a material of, but not limited to, wool, cotton, acrylic, synthetic fabric, satin, silk, cloth, paper products of different types comprising: single or multiple ply paper, laminated paper, crepe paper, self-sticking paper and/or any combination thereof while said outside shell may be made of a limp material selected from the group consisting of, but not limited to, wool, cotton, synthetic fabric, cloth, suede, nylon, leather, and/or any combination thereof.

Yet another embodiment of the present invention relates to a shoelace made of a pre-selected length of a flexible but resilient material comprising: an outside shell; an adhesive film sleeve, a sheath; a bendable support assembly, which comprises at least one bendable support element comprising a support element core coated with a wax coating compound, or more than one bendable support element, that is arranged to have a center support element core with multiple surrounding support element cores and the entire said bendable support assembly is coated with said wax compound. Here, the bendable support assembly is encased in said sheath, which is, in turn, encased in said adhesive film sleeve, which is, in turn, encased in said outside shell.

According to this embodiment, the bendable support element core is made of a soft and flexible material selected from the group consisting of, but not limited to, wool, cotton, acrylic, fabric, and/or any combination thereof, while said sheath is a material made of, but not limited to, wool, cotton, acrylic, synthetic fabric, satin, silk, cloth, paper and/or any combination thereof and said adhesive film sleeve can be made of a plant based or synthetic resin compound with the adhesive on one or both of the faces of a removable plastic or paper backsheet and wherein said outside shell is made of a limp material selected from the group consisting of, but not limited to, wool, cotton, acrylic, synthetic fabric, satin, silk, cloth, nylon, leather, and/or any combination thereof. A pre-selected length of said flexible but resilient material comprises a first end and a second end and each of said ends is secured by a plastic end-cap tubing or metal/plastic aglet, or by crimping.

Further another embodiment of the present invention relates to a method of manufacturing a shoelace made of a pre-selected length of a flexible but resilient material with an outside shell and an internal bendable support core comprising: i) providing an internal support core by coating at least one bendable support element core with microcrystalline wax compound using a dipping method, wherein when more than one support element core is present, arranging them with an even-spacing or first arranging the cores such that one core is in the center and then arranging the remaining cores to surround the center core with an even-spacing and making the entire support core assembly coated with microcrystalline wax compound; ii) constructing a sheath in close proximity around (i.e., encasing) said core, said sheath extending along said length of said core, said sheath having an outer surface for contact within an adhesive film sleeve, wherein said sheath is constructed after the wax coating is hardened; iii) wrapping the sheath encasing the internal support core with the adhesive film sleeve, which can be made of a plant based or synthetic resin compound with the adhesive on one or both of the faces of a removable plastic or paper backsheet; iv) wrapping the adhesive film sleeve encasing the internal support assembly with an outside shell made of limp material; v) cutting the resulting shoelace made of said flexible but resilient material of said desired shape into a pre-selected length; vi) securing each of the two ends of said resulting shoelace made of said flexible but resilient material of said desired shape and length with a plastic end-cap tubing or metal/plastic aglet, or with a plastic end-cap.

It is an object of at least one embodiment of the present invention to provide a method of helping young children, the physically challenged or individuals who have physical disabilities in easily tying their shoelaces.

It is another object of at least one embodiment of the present invention to provide a method for constructing a flexible but resilient material that can have multiple applications.

It is another object of at least one embodiment of the present invention to provide a microcrystalline wax compound that can help to form and maintain the shape and appearance of a shoelace knot.

It is another object of at least one embodiment of the present invention to provide a shoelace with a flexible but resilient core assembly/sheath/adhesive film/outside shell structure, wherein the flexible but resilient core assembly comprises one or more bendable support core elements and the entire said bendable support assembly is coated with a microcrystalline wax compound.

It is another object of at least one embodiment of the present invention to provide a material that it is inexpensive and easy to use.

It is another object of at least one embodiment of the present invention to provide a material that can have multiple potential applications in various fields.

DESCRIPTION OF THE PREFERRED EMBODIMENTS

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Figure 1A:
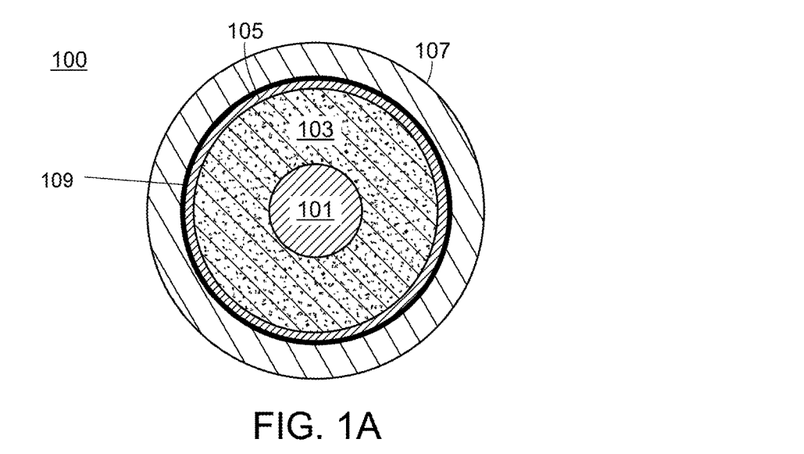
FIG. 1A shows a cross-sectional view of an embodiment of the invention.
Figure 1B:
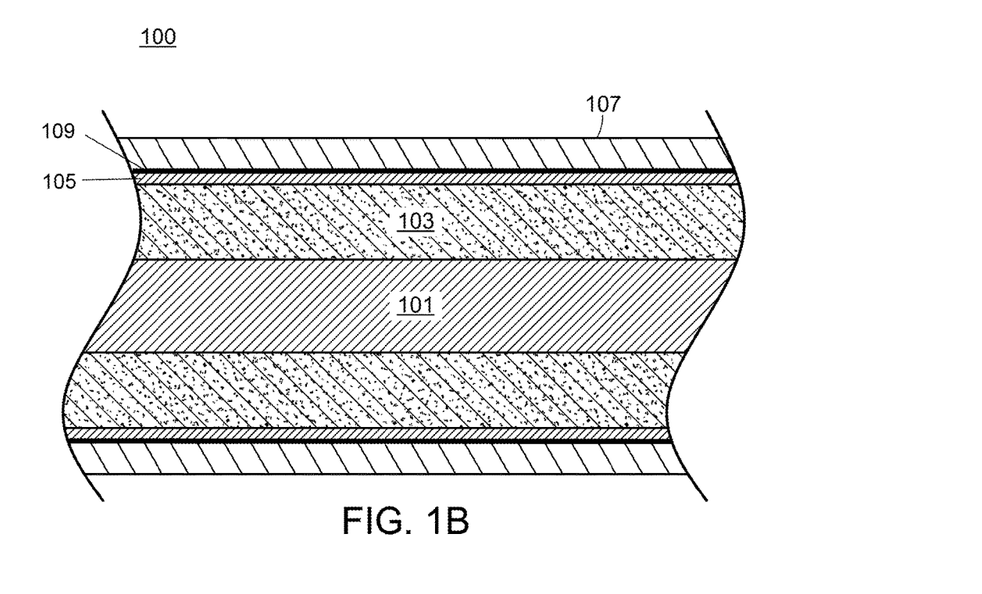
FIG. 1B shows a cut-away view of a part of an embodiment of the invention.

Referring now to FIGS. 1A and 1B, FIG. 1A illustrates a cross-sectional view of a preferred embodiment 100 of the present invention of a length of a flexible but resilient material comprising: a bendable support assembly, which comprises at least one bendable support element comprising a support element core 101 coated with a wax coating compound 103. This bendable support assembly is encased in a sheath 105, which is, in turn, encased in an adhesive film sleeve 109, which is, further in turn, encased in an outside shell 107. FIG. 1B illustrates a cut-away view (along the length) of the same preferred embodiment 100. A pre-selected length of said flexible but resilient material comprises a first end and a second end and each of said ends is crimped, capped by a plastic end-cap tubing or metal/plastic aglet.

Figure 2A:
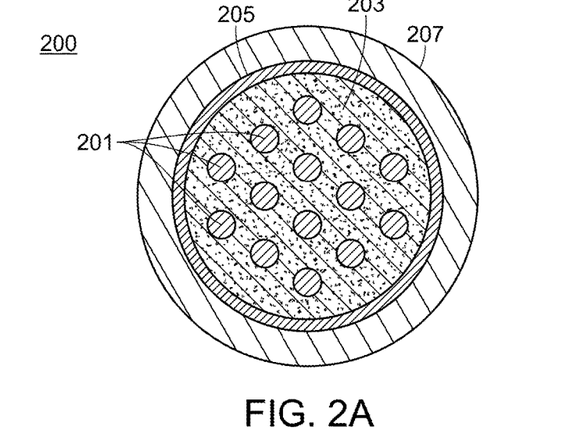
FIG. 2A shows a cross-sectional view of another embodiment of the invention.
Figure 2B:
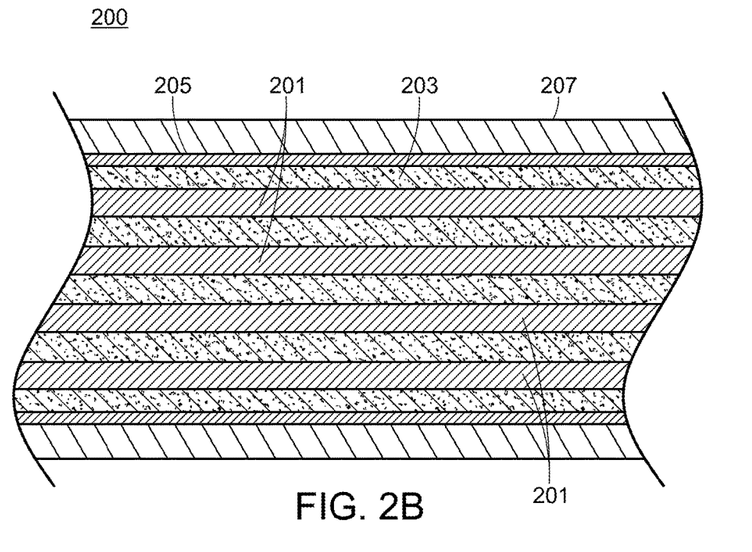
FIG. 2B shows a cut-away view of a part of another embodiment of the invention.

Referring now to FIGS. 2A and 2B, FIG. 2A illustrates a cross-sectional view of another preferred embodiment 200 of the present invention of a length of a flexible but resilient material comprising: a bendable support assembly, which comprises more than one bendable support element that is arranged to have a center support element core with multiple surrounding support element cores 201 and said bendable support assembly is coated with said wax compound 203. Multiple, rather than a single, support elements are preferable because their combination provides increased strength and rigidity. This bendable support assembly is encased in a sheath 205, which is, in turn, may be encased in an adhesive film sleeve 109 (see FIG. 1), which is, further in turn, encased in an outside shell 207. FIG. 2B illustrates a cut-away view (along the length) of the same preferred embodiments 200. A pre-selected length of said flexible but resilient material comprises a first end and a second end and each of said ends is crimped, capped by a plastic end-cap tubing or metal/plastic aglet.

Figure 3A:
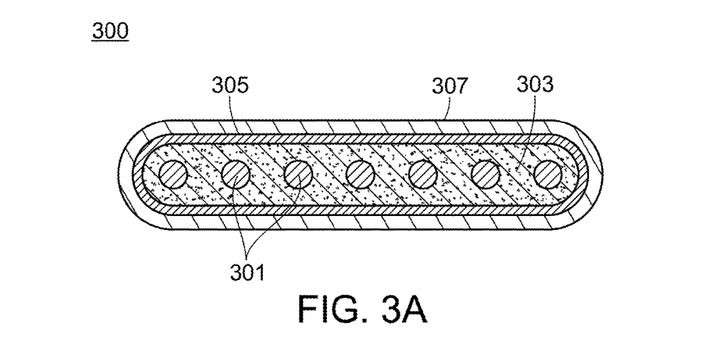
FIG. 3A shows a cross-sectional view of yet another embodiment of the invention.
Figure 3B:
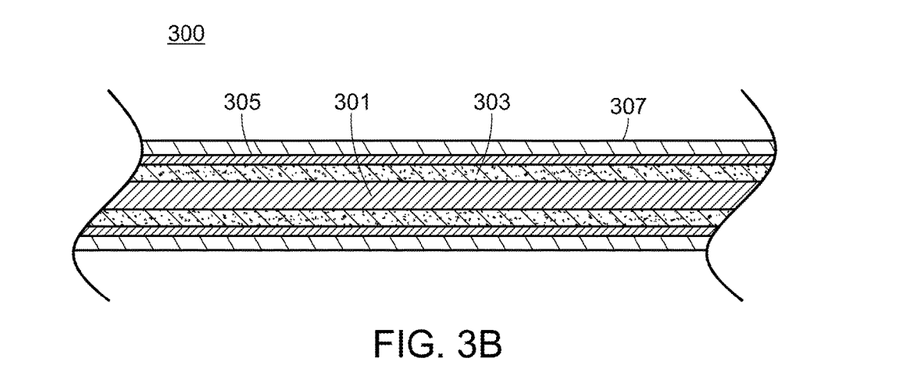
FIG. 3B shows a cut-away view of a part of yet another embodiment of the invention.

Referring now to FIGS. 3A and 3B, FIG. 3A illustrates a cross-sectional view of yet another preferred embodiment 300 of the present invention of a length of a flexible but resilient material comprising: a bendable support assembly, which comprises more than one bendable support element arranged to have said multiple support element cores 301 evenly spaced to each other and said bendable support assembly is coated with said wax compound 303. Multiple, rather than a single, support elements are preferable because their combination provides increased strength and rigidity. This bendable support assembly is encased in a sheath 305, which, in turn, may be encased in an adhesive film sleeve 109 (see FIG. 1), which is, further in turn, encased in an outside shell 307. FIG. 3B illustrates a cut-away view (along the length) of the same preferred embodiments 300. A pre-selected length of said flexible but resilient material comprises a first end and a second end and each of said ends is crimped, capped by a plastic end-cap tubing or metal/plastic aglet.

Figure 4:
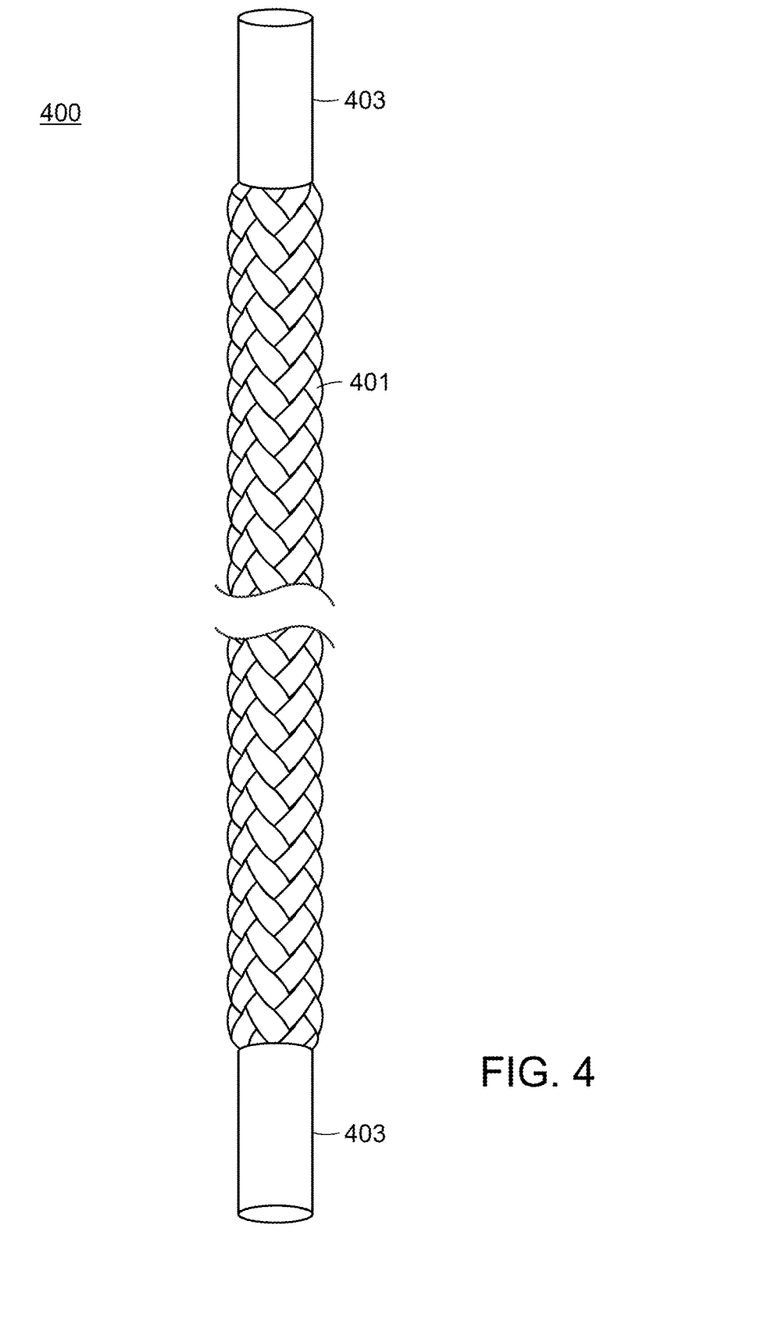
FIG. 4 shows a perspective view of an embodiment of the invention.

Turning now to FIG. 4, there is a perspective view of yet another preferred embodiment 400 of the present invention of a shoelace 401 made of a pre-selected length of a flexible but resilient material comprising: an outside shell; an adhesive film sleeve; a sheath; a bendable support assembly, which comprises at least one bendable support element comprising a support element core coated with a wax coating compound, or more than one bendable support element, that may be arranged in various ways, such as, with an even-spacing among them, or having a center support element core that is surrounded by multiple support element cores with an even-spacing, etc. and said bendable support assembly is coated with said wax compound. Here, the bendable support assembly is encased in said sheath, which in turn may be encased in an adhesive film sleeve, which is, further in turn encased in said outside shell. A pre-selected length of said flexible but resilient material comprises a first end and a second end and each of said ends is secured by a plastic end-cap tubing 403, or metal/plastic aglet, or by crimping.

A variety of materials are contemplated as being suitable for constructing all of the above-mentioned embodiments. For example, said bendable support element core may be made of a soft and flexible material selected from the group consisting of, but not limited to, wool, cotton, acrylic, fabric, and/or any combination thereof, while said sheath may be a material made of, but not limited to wool, cotton, acrylic, synthetic fabric, satin, silk, cloth, paper products of different types comprising: single or multiple ply paper, laminated paper, crepe paper, self-sticking paper and/or any combination thereof. Additionally, it is contemplated that the outside shell may be made of a limp material selected from the group consisting of, but not limited to, wool, cotton, synthetic fabric, cloth, suede, nylon, leather, and/or any combination thereof, i.e., materials typically utilized in constructing a shoelace.

The cross section of the shoelace according to the preferred embodiment shown in FIG. 4 is either cylindrical or rectangular in shape, wherein the wax compound coating the support element core is a microcrystalline wax of laminating or food grade and wax adhesive compound. The composition of such microcrystalline wax compound contains a waxy ingredient that is naturally occurring or synthetic. The thickness of said microcrystalline wax compound coating on the bendable support element core is about 0.1 to about 10 millimeters and about 5 to about 30 percent by weight based on the total combined weight of the bendable support element.

Yet another preferred embodiment of the present invention relates to a method of manufacturing a shoelace made of a pre-selected length of a flexible but resilient material with an outside shell and an internal bendable support core comprising: i) providing an internal support core by coating at least one bendable support element core with microcrystalline wax compound using a dipping method, wherein when more than one support element core is present, arranging them with an even-spacing or first arranging the cores such that one core is in the center and then arranging the remaining cores to surround the center core with an even-spacing and making the entire support core assembly coated with a microcrystalline wax compound; ii) constructing a sheath in close proximity around (i.e., encasing) said core, said sheath extending along said length of said core, said sheath having an outer surface for contact within an adhesive film sleeve, wherein said sheath is constructed after the wax coating is hardened; iii) wrapping the sheath encasing the internal support core with the adhesive film sleeve, which can be made of a plant based or synthetic resin compound with the adhesive on one or both of the faces of a removable plastic or paper backsheet; iv) threading the adhesive film sleeve encasing the internal support assembly through a hollow tubular outside shell made of limp material; v) cutting the resulting shoelace made of said flexible but resilient material of said desired shape into a pre-selected length; v) securing each of the two ends of said resulting shoelace made of said flexible but resilient material of said desired shape and length with a plastic end-cap tubing or metal/plastic aglet.

EXAMPLE

In the example described below, the following components, materials and manufacturing procedural steps, as summarized in the Table, were used, unless otherwise noted:

Method Utilized To Manufacture One Small Batch of Laces Comprising of about 5 Units

| Components | Material/Makeup | Specifications/Quantity | Procedure |
|---|---|---|---|
| Internal Bendable Support Core/Element | 5 strands of cotton/acrylic blend yarn | Each measuring about ¼ inch wide and 45 inches long | 1. Cut yarn to 45 inches in length |
| Waxy Compound | 1. Microcrystalline wax pastilles | A total of 2 ounces/60 grams was used per batch | 2. Melt wax pastilles and wax adhesive additive at a temperature of about 85 degrees F<br>3. Rest yarn in microcrystalline bath for at least 5 minutes |
| | 2. Wax adhesive | .5 ounces | 4. Remove strands and allow to dry on a nonstick surface for at least 10 minutes until solid and assembly comes to a temperature near or at room temperature |

Method Utilized To Manufacture One Small Batch of Laces Comprising of about 5 Units

| Components | Material/Makeup | Specifications/Quantity | Procedure |
| --- | --- | --- | --- |
| Inner Sheath | 5 pieces of Polyester blend ribbon or crepe paper | Each measuring 3/8 of an inch wide and 45 inches long | 5. Cut ribbon or paper to 45 inches in length<br>6. Press along the length of the support assembly to adhere |
| Adhesive layer | 5 strips of fabric adhesive | Each measuring 3/8 of an inch wide and 45 inches long | 7. Cut adhesive strip to 45 inches in length<br>8. Press along the length of the support assembly to adhere |
| Outer Shell | 5 polyester blend outer shells/hollow shoelace strings | Each measuring 1/4 inch in wide and 45 inches long | 9. Support assembly covered in sheath and/or adhesive is threaded through tubular hollow outer shell |
| End-cap/Securing Element | 1. 10 metal aglets | Each piece measures about 1 inch in length | 10. Affix aglets to both ends of each completed lace using a crimping tool<br>Or |
|  | 2. 10 pieces of polyolefin heat shrink tubing | Each piece measuring about 1 inch in length and 3/16 of an inch in diameter | 10. Cut heat shrink tubing to 1 inch in length and slide over ends<br>11. Heat to shrink tubing resulting in a close wrapping effect around assembly ends |

As described in the table above, the present invention, in some embodiments, may be manufactured by first using an internal bendable support/core element that is made of a strand of cotton/acrylic blend yarn that measures about ¼ of an inch wide and about 45 inches long.

The yarn may then coated by a waxy compound by placing it in a warm wax bath made of microcrystalline pastilles measuring at least 12 grams in weight and 0.5 ounces of a wax adhesive additive and melted at a temperature of 85 degrees Fahrenheit.

After soaking for at least 5 minutes, the yarn may be removed and allowed to dry for at least 10 minutes to a temperature near or at room temperature until it forms the solid support assembly. The solid wax coated support assembly is then covered by an inner sheath made of a polyester blend fabric measuring about ⅜ of an inch wide and about 45 inches long that is pressed along the length of the solid support assembly until it adheres. Alternative materials for the inner sheath include paper products of different types comprising: single or multiple ply paper, laminated paper, crepe paper, self-sticking paper.

The assembly with its affixed inner sheath may then be encased by an adhesive film sleeve, which may then be further encased by an outer shell made of a hollow, tubular, braided polyester fabric blend measuring about ½ of an inch in diameter and about 45 inches in length. The ends of the resulting flexible, resilient embodiment may then be finally secured by slipping on an end cap made of a cylindrical piece of polyolefin tubing measuring about 1 inch in length and about 3/16 of an inch in diameter that is heated until it shrinks to about half of its original diameter, resulting in a close wrapping effect around the assembly's ends or by crimping metal aglets measuring about 1 inch in length around the assembly's ends.

The many elements of the present invention make it unique in the field. The novelty is illustrated by the various options for nearly every aspect of the invention that allow it to be used in a variety of additional embodiments and further by adding or deleting several core units and affixing them between different types of fabrics/materials.

In one such embodiment to be used in garments and/or under garments, the material of the present invention can be used to replace drawstrings, ties, or wire found in various products including, but not limited to, hoodies, jackets, corset/waist trainers, scrub uniform pants, bras, men's ties/bows, drawstring backpack, etc.

In another such embodiment, the material of the present invention can be used to manufacture hair ties, or the substructures/components/supports used in common items including, but not limited to, bag handles, brims of hats, etc.

In yet another such embodiment, the material of the present invention can be used to replace the string/ties/rope used in the following skill building activities, including, but not limited to, boy scouts knot tying, weaving mats, string used in a stringing bead set for children, knot tying games, shoelace tying books, etc.

In still another such embodiment, the material of the present invention can be used to form a core panel in the following products for special needs children, including, but not limited to, weighted vests, weighted blankets, weighted bean bags, yoga mats, etc.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A length of a flexible, resilient material for a shoelace comprising:
    an outside shell;
    an adhesive film sleeve
    a sheath;
    a bendable support assembly;
    a wax coating compound,
    wherein said bendable support assembly comprises at least one bendable support element comprising a support element core coated with said wax coating compound;
    wherein said at least one bendable support element core is encased in said sheath;
    wherein said sheath encasing said bendable support assembly is encased in said outside shell; and
    wherein a length of said material comprises a first end and a second end and each of the first and the second end is capped by an end-cap.

2. The material of claim 1, wherein said bendable support assembly, when comprising more than one bendable support element, is configured to have a central support element core that is flanked by outer support element cores.

3. The material of claim 1, wherein said bendable support element core is made of a material selected from the group consisting of wool, cotton synthetic fabric, or natural fabric, and wherein said sheath comprises a paper, cloth, cotton, acrylic, or synthetic fabric.

4. The material of claim 1, wherein the wax coating compound is a microcrystalline wax of laminating or food grade and wax adhesive compound.

5. The material of claim 1, wherein a thickness of said waxy coating compound on said bendable support element core is about 0.1 to about 10 millimeters.

6. The material of claim 1, wherein the heath encasing the bendable support assembly is first encased in an adhesive film sleeve and the resulting encased assembly is subsequently encased in said outside shell.

7. The material of claim 6, wherein the encased assembly may be secured by slipping on an end cap made of a cylindrical piece of polyolefin tubing measuring about 1 inch in length and about 3/16 of an inch in diameter that is heated until it shrinks to about half of its original diameter, resulting in a close wrapping effect around the assembly's ends or by crimping metal aglets measuring about 1 inch in length around the assembly's ends.

8. A shoelace comprising:
an outside shell:
an adhesive film sleeve:
a sheath;
a bendable support assembly;
a wax coating compound;
wherein said bendable support assembly comprises at least one bendable support element comprising a support element core coated with said wax coating compound;
wherein said at least one bendable support element core is encased in said sheath;
wherein said sheath is encased in said adhesive film sleeve;
wherein said adhesive film sleeve is encased in said outside shell; and
wherein said shoelace comprises a first end and a second end and each of said first end and said second end is capped by an end-cap.

9. The shoelace of claim 8, wherein said bendable support assembly, when comprising more than one bendable support element, comprises a central support element core surrounded by outer support element cores.

10. The shoelace according to claim 8, wherein said support element core of said bendable support elements made of a material selected from the group consisting of wool, cotton, acrylic, fabric, or any combination thereof.

11. The shoelace of claim 8, wherein said sheath comprises wool, cotton, acrylic, synthetic fabric, satin, silk, cloth, paper, or any combination thereof.

12. The shoelace of claim 8, wherein said adhesive film sleeve, which is be made of a plant based or synthetic resin compound with the adhesive on one or both faces of a removable plastic or paper backsheet.

13. The shoelace of claim 8, wherein said outside shell is selected from the group consisting of wool, cotton, synthetic fabric, cloth, suede, nylon, leather, or any combination thereof.

14. The shoelace of claim 8, wherein the wax coating compound is a microcrystalline wax of laminating or food grade and wax adhesive compound,
wherein said microcrystalline wax compound contains a waxy ingredient that is naturally occurring or synthetic, and
wherein a thickness of said microcrystalline wax compound on said bendable support element core is about 0.1 to about 10 millimeters.

15. The shoelace of claim 8, wherein said end-cap is a plastic tubing or aglet.

16. The shoelace of claim 8, wherein said shoelace is cylindrical in shape.

17. The material of claim 1 further comprising a plastic end-cap tubing or aglet coupled to each of said first end and/or said second end of said length of said material.

18. The material of claim 4 wherein said microcrystalline wax compound is a solid at a temperature of from about −20° C. to about 50° C.

* * * * *